(12) United States Patent
Hua et al.

(10) Patent No.: US 11,567,222 B2
(45) Date of Patent: Jan. 31, 2023

(54) X-RAY DETECTING PANEL COMPRISING A PHOTODIODE, A MAIN BIAS VOLTAGE SIGNAL LINE, AND AN AUXILIARY BIAS VOLTAGE SIGNAL LINE, X-RAY DETECTING DEVICE, AND MANUFACTURING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Gang Hua, Beijing (CN); Lei Mi, Beijing (CN); Yanna Xue, Beijing (CN); Zhiying Bao, Beijing (CN); Yong Zhang, Beijing (CN); Lu Bai, Beijing (CN); Jingpeng Wang, Beijing (CN); Haobo Fang, Beijing (CN); Jian Lin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 801 days.

(21) Appl. No.: 16/341,247

(22) PCT Filed: Sep. 26, 2018

(86) PCT No.: PCT/CN2018/107600
§ 371 (c)(1),
(2) Date: Apr. 11, 2019

(87) PCT Pub. No.: WO2019/148861
PCT Pub. Date: Aug. 8, 2019

(65) Prior Publication Data
US 2021/0364662 A1 Nov. 25, 2021

(30) Foreign Application Priority Data

Feb. 1, 2018 (CN) .......................... 201810102744.2

(51) Int. Cl.
*G01T 1/20* (2006.01)

(52) U.S. Cl.
CPC ............ *G01T 1/20184* (2020.05); *G01T 1/20* (2013.01); *G01T 1/2006* (2013.01); *G01T 1/2018* (2013.01)

(58) Field of Classification Search
CPC ....... A61B 6/42; A61B 6/4208; A61B 6/4233; A61B 6/4241; A61B 6/4283;
(Continued)

(56) References Cited

U.S. PATENT DOCUMENTS 5,677,539 A * 10/1997 Apotovsky ............. G01T 1/241
250/370.13
5,920,070 A * 7/1999 Petrick ................... H04N 5/325
250/370.09
(Continued)

FOREIGN PATENT DOCUMENTS

CN 1505389 A 6/2004
CN 102376725 A 3/2012
(Continued)

OTHER PUBLICATIONS

An English translation of JP2013172101A by Patent Translate. (Year: 2022).*
(Continued)

*Primary Examiner* — Allen C. Ho
(74) *Attorney, Agent, or Firm* — Nath, Goldberg & Meyer; Joshua B. Goldberg

(57) ABSTRACT

The present disclosure provides an X-ray detecting device, and a manufacturing method of an X-ray detecting panel. The present disclosure also provides an X-ray detecting
(Continued)

panel including a main bias voltage signal line and a photodiode. A cathode of the photodiode is electrically connected to the main bias voltage signal line. The X-ray detecting panel further includes at least one auxiliary bias voltage signal line electrically connected to the main bias voltage signal line.

17 Claims, 3 Drawing Sheets

(58) Field of Classification Search
CPC ....... A61B 6/4266; G01T 1/20; G01T 1/2006; G01T 1/2018; G01T 1/20184; G01T 1/24; G01T 1/241; G01T 1/247
USPC ..................................... 378/98.8; 250/370.09
See application file for complete search history.

(56) References Cited

U.S. PATENT DOCUMENTS

| | | | | |
|---|---|---|---|---|
| 6,002,134 A * | 12/1999 | Lingren | ............ | H01L 27/14659 250/370.01 |
| 7,042,980 B2 * | 5/2006 | Endo | .................... | G01T 1/2928 250/208.1 |
| 7,081,629 B2 | 7/2006 | Endo | | |
| 7,091,465 B2 * | 8/2006 | Miyaguchi | ........... | A61B 6/4233 250/208.1 |
| 7,214,945 B2 * | 5/2007 | Nomura | ............ | H01L 27/14692 250/336.1 |
| 7,408,167 B1 * | 8/2008 | Kameshima | ...... | H01L 27/14663 348/E5.081 |
| 7,429,723 B2 * | 9/2008 | Mochizuki | ........ | H01L 27/14603 257/E27.14 |
| 7,435,968 B2 * | 10/2008 | Watanabe | ......... | H01L 27/14609 250/370.09 |
| 7,453,068 B2 * | 11/2008 | Blevis | .................... | G01T 1/2018 250/370.01 |
| 7,462,834 B2 * | 12/2008 | Masazumi | ............... | G01T 1/244 250/370.09 |
| 7,557,355 B2 * | 7/2009 | Mochizuki | ........ | H01L 27/14609 257/444 |
| 7,767,974 B2 | 8/2010 | Jung et al. | | |
| 8,067,744 B2 * | 11/2011 | Blevis | ..................... | G01T 1/241 250/370.09 |
| 8,664,615 B2 * | 3/2014 | Amitani | ............... | A61B 6/4233 250/370.09 |
| 8,742,316 B2 * | 6/2014 | Kim | ........................ | G01J 1/46 250/214.1 |
| 8,759,785 B2 | 6/2014 | Ishii et al. | | |
| 8,785,867 B2 * | 7/2014 | Zhang | ............... | H01L 27/14659 250/370.08 |
| 8,835,862 B2 * | 9/2014 | Tajima | ..................... | H04N 5/32 250/370.09 |
| 8,847,138 B2 * | 9/2014 | Sugawara | ............ | H04N 5/374 250/370.08 |
| 8,866,095 B2 * | 10/2014 | Oguma | ................ | A61B 6/4283 250/370.11 |
| 8,872,118 B2 * | 10/2014 | Nishino | ................... | H04N 5/32 250/370.09 |
| 8,916,830 B2 * | 12/2014 | Lim | ...................... | G01T 1/2928 250/370.11 |
| 8,969,821 B2 * | 3/2015 | Kim | .................. | H01L 27/14663 250/370.09 |
| 9,024,244 B2 * | 5/2015 | Amitani | ............ | H01L 27/14618 250/214 R |
| 9,035,263 B2 * | 5/2015 | Iwata | .................... | G01T 1/2018 250/366 |
| 9,128,368 B2 * | 9/2015 | Tajima | ................... | H04N 5/361 |
| 9,134,436 B2 | 9/2015 | Kwak et al. | | |
| 9,287,315 B2 | 3/2016 | Kim et al. | | |
| 9,423,512 B2 | 8/2016 | Sato et al. | | |
| 9,502,451 B2 * | 11/2016 | Yamashita | ........ | H01L 27/14603 |
| 9,594,172 B1 | 3/2017 | Karunasiri et al. | | |
| 9,977,135 B2 * | 5/2018 | Yokoyama | .............. | G01T 1/023 |
| 10,054,695 B2 * | 8/2018 | Lee | ................... | H01L 27/14676 |
| 10,096,642 B2 * | 10/2018 | Ishino | ............... | H01L 27/14659 |
| 10,105,114 B2 * | 10/2018 | Shimizukawa | .......... | A61B 6/44 |
| 10,281,597 B2 * | 5/2019 | Tredwell | ................ | G01T 1/241 |
| 10,353,082 B2 * | 7/2019 | Tomiyasu | ................ | G01T 1/20 |
| 10,381,396 B2 * | 8/2019 | Tomiyasu | ................ | G01T 1/20 |
| 10,431,610 B2 | 10/2019 | Cho | | |
| 10,440,290 B2 * | 10/2019 | Kikuchi | ................... | H04N 5/32 |
| 10,470,727 B2 * | 11/2019 | Ota | ......................... | A61B 6/54 |
| 10,580,818 B2 * | 3/2020 | Misaki | .................... | H04N 5/369 |
| 10,649,100 B2 * | 5/2020 | Kim | ...................... | G01T 1/2018 |
| 10,804,314 B2 * | 10/2020 | Misaki | .............. | H01L 27/14612 |
| 10,816,681 B2 * | 10/2020 | Abe | ...................... | H01G 9/2018 |
| 11,289,614 B2 * | 3/2022 | Yamamoto | ............ | H01L 31/107 |
| 2007/0045556 A1 | 3/2007 | Watanabe et al. | | |
| 2008/0302969 A1 | 12/2008 | Jung et al. | | |
| 2011/0133059 A1 | 6/2011 | Kim et al. | | |

FOREIGN PATENT DOCUMENTS

| | | |
|---|---|---|
| CN | 102629610 A | 8/2012 |
| CN | 102664184 A | 9/2012 |
| CN | 103839948 A | 6/2014 |
| CN | 104023184 A | 9/2014 |
| CN | 105592797 A | 5/2016 |
| CN | 105824185 A | 8/2016 |
| CN | 108318907 A | 7/2018 |
| JP | 2002076360 A | 3/2002 |
| JP | 2013172101 A | 9/2013 |
| JP | 2014078651 A | 5/2014 |
| JP | 2016032053 A | 3/2016 |
| KR | 20110065285 A | 6/2011 |
| KR | 20150015890 A | 2/2015 |
| WO | 2016168151 A1 | 10/2016 |

OTHER PUBLICATIONS

First Office Action dated Apr. 10, 2019 corresponding to Chinese Application No. 201810102744.2.
International Search Report dated Jan. 11, 2019 corresponding to Application No. PCT/CN2018/107600; English Translation Attached.
Notification of Reason for Refusal dated Nov. 5, 2020 corresponding to Korean application No. 10-2019-7018841.
First Office Action dated May 10, 2021 for Indian application No. 201927026287.
Extended European Search Report dated Oct. 18, 2021 corresponding to application No. 18893332.9-1001.
First Office Action dated Aug. 8, 2022 for application No. JP2019-536549 with English translation attached.

* cited by examiner

X-RAY DETECTING PANEL COMPRISING A PHOTODIODE, A MAIN BIAS VOLTAGE SIGNAL LINE, AND AN AUXILIARY BIAS VOLTAGE SIGNAL LINE, X-RAY DETECTING DEVICE, AND MANUFACTURING METHOD THEREOF

CROSS-REFERENCE TO RELATED APPLICATION

This is a National Phase Application filed under 35 U.S.C. 371 as a national stage of PCT/CN2018/107600, filed on Sep. 26, 2018, an application claiming the benefit of priority to Chinese Patent Application No. 201810102744.2 filed to the National Intellectual Property Administration of P.R. China on Feb. 1, 2018, the contents of which are incorporated herein in their entirety by reference.

TECHNICAL FIELD

The present disclosure relates to the field of X-ray detecting devices, and in particular to an X-ray detecting panel, a method for manufacturing the X-ray detecting panel, and an X-ray detecting device including the X-ray detecting panel.

BACKGROUND

With the popularization of digital medical treatment, flat panel X-ray detectors are phased in to serve as X-ray detectors in commonly used medical devices. In a common flat panel X-ray detector, a current passing through a photodiode is affected by X-rays, and an intensity of the X-rays can be determined by detecting the current in a bias voltage signal line.

SUMMARY

According to an aspect of the present disclosure, there is provided an X-ray detecting panel including: a photodiode, a main bias voltage signal line configured such that a main bias voltage is provided to the photodiode through the main bias voltage signal line; and an auxiliary bias voltage signal line configured such that an auxiliary bias voltage is provided to the photodiode through the auxiliary bias voltage signal line; wherein the auxiliary bias voltage signal line is electrically connected to the main bias voltage signal line.

In an embodiment, an extending direction of the auxiliary bias voltage signal line is perpendicular to an extending direction of the main bias voltage signal line.

In an embodiment, a first passivation layer covers a layer in which the main bias voltage signal line is located. The auxiliary bias voltage signal line is disposed on the first passivation layer. The auxiliary bias voltage signal line is electrically connected to the main bias voltage signal line through a first via hole penetrating through the first passivation layer.

In an embodiment, a bonding pad is disposed on the first passivation layer. A lead wire is disposed under the first passivation layer. The bonding pad is electrically connected to the lead wire through a second via penetrating through at least the first passivation layer. The auxiliary bias voltage signal line is disposed in the same layer as the bonding pad. The auxiliary bias voltage signal line and the bonding pad are made of a transparent electrode material.

In an embodiment, a first electrode of a switching transistor is electrically connected to an anode of the photodiode.

In an embodiment, the main bias voltage signal line is made of a metal material and covers the switching transistor.

In an embodiment, a planarization layer covers a layer in which the photodiode is located. A second passivation layer covers the planarization layer. The main bias voltage signal line is formed on the second passivation layer, and is electrically connected to a cathode of the photodiode through a third via hole penetrating through the second passivation layer and the planarization layer.

In an embodiment, a scintillation layer is disposed on a light incident surface of the X-ray detecting panel, and the scintillation layer is capable of converting X-rays into visible light.

According to an aspect of the present disclosure, there is provided an X-ray detecting panel including: a plurality of photodiodes; a plurality of main bias voltage signal lines configured such that main bias voltages are provided to the plurality of photodiodes through the plurality of main bias voltage signal lines, respectively; and at least one auxiliary bias voltage signal line configured such that an auxiliary bias voltage is provided to part of the plurality of photodiodes through the at least one auxiliary bias voltage signal line; wherein the at least one auxiliary bias voltage signal line is electrically connected to all of the plurality of main bias voltage signal lines.

In an embodiment, a first passivation layer covers a layer in which the plurality of main bias voltage signal lines are located. The at least one auxiliary bias voltage signal line is disposed on the first passivation layer. The at least one auxiliary bias voltage signal line is electrically connected to all of the plurality of main bias voltage signal lines through first via holes penetrating through the first passivation layer.

In an embodiment, the X-ray detecting panel is divided into a detection area and a peripheral area located on at least one side of the detection area. The detection area is divided into a plurality of detection units, and each of the plurality of detection units is provided therein with one of the plurality of photodiodes. Cathodes of the photodiodes in the detection units in a same column are electrically connected to a same main bias voltage signal line.

In an embodiment, at least one set of lead wires are disposed in the peripheral area. A plurality of bonding pads are electrically connected to the set of lead wires through second via holes. The plurality of main bias voltage signal lines are disposed in a same layer. The at least one auxiliary bias voltage signal line is disposed in the same layer as the plurality of bonding pads. The at least one auxiliary bias voltage signal line and the plurality of bonding pads are made of a transparent electrode material.

According to an aspect of the present disclosure, there is provided an X-ray detecting device including: the above-described X-ray detecting panel, a main bias voltage signal source configured to supply main bias voltages to the plurality of photodiodes through the plurality of main bias voltage signal lines; and an auxiliary bias voltage signal source configured to supply an auxiliary bias voltage to part of the plurality of photodiodes through the at least one auxiliary bias voltage signal line.

In an embodiment, the X-ray detecting device further includes: a plurality of data lines and a plurality of gate lines. The plurality of data lines are disposed to intersect the plurality of gate lines such that the X-ray detecting panel is divided into detection units arranged in a plurality of rows and a plurality of columns, and each of the detection units arranged in the plurality of rows and the plurality of columns is provided with one photodiode and one switching transistor. Switching transistors in a same column are connected to a same data line. Switching transistors in a same row are connected to a same gate line. A first electrode of the one switching transistor is electrically connected to an anode of the photodiode in the detection unit. A second electrode of the one switching transistor is electrically connected to one of the plurality of data lines. A control electrode of the one switching transistor is electrically connected to one of the plurality of gate lines.

In an embodiment, the X-ray detecting panel is divided into a detection area and a peripheral area located on at least one side of the detection area. The detection units arranged in the plurality of rows and the plurality of columns are disposed in the detection area. The auxiliary bias voltage signal source and the main bias voltage signal source are disposed in the peripheral area.

According to an aspect of the present disclosure, there is provided a manufacturing method of an X-ray detecting panel including: providing a substrate; forming a photodiode on the substrate; forming a pattern including a main bias voltage signal line on the photodiode, the main bias voltage signal line being electrically connected to a cathode of the photodiode; forming a pattern including an auxiliary bias voltage signal line on the pattern including the main bias voltage signal line, the auxiliary bias voltage signal line being electrically connected to the main bias voltage signal line.

In an embodiment, between the step of forming the pattern including the main bias voltage signal line and the step of forming the pattern including the auxiliary bias voltage signal line, the method further includes steps of: forming a first passivation material layer on a layer in which the main bias voltage signal line is located; and forming a first via hole penetrating through the first passivation material layer such that the auxiliary bias voltage signal line obtained in the step of forming the pattern including the auxiliary bias voltage signal line is electrically connected to the main bias voltage signal line through the first via.

In an embodiment, the manufacturing method further includes: forming a pattern including at least one set of lead wires before the step of forming the first passivation material layer; forming, after forming the first passivation material layer, a second via hole penetrating through at least the first passivation material layer to expose the lead wire, the first via hole and the second via hole being formed by one patterning process; and forming a pattern including a bonding pad after forming the second via hole, the bonding pad being electrically connected to the lead wire through the second via, wherein the pattern including the auxiliary bias voltage signal line and the pattern including the bonding pad are formed by one patterning process.

BRIEF DESCRIPTION OF THE DRAWINGS

The accompanying drawings, which serve to provide a further understanding of the present disclosure and constitute a part of the specification, are used for explaining the present disclosure together with the following specific implementations, rather than limiting the present disclosure. In the drawings.

DETAILED DESCRIPTION

The specific implementations of the present disclosure will be described in detail below with reference to the accompanying drawings. It is to be understood that the specific implementations described herein are merely used for describing and explaining the present disclosure, and are not intended to limit the present disclosure.

Figure 1:
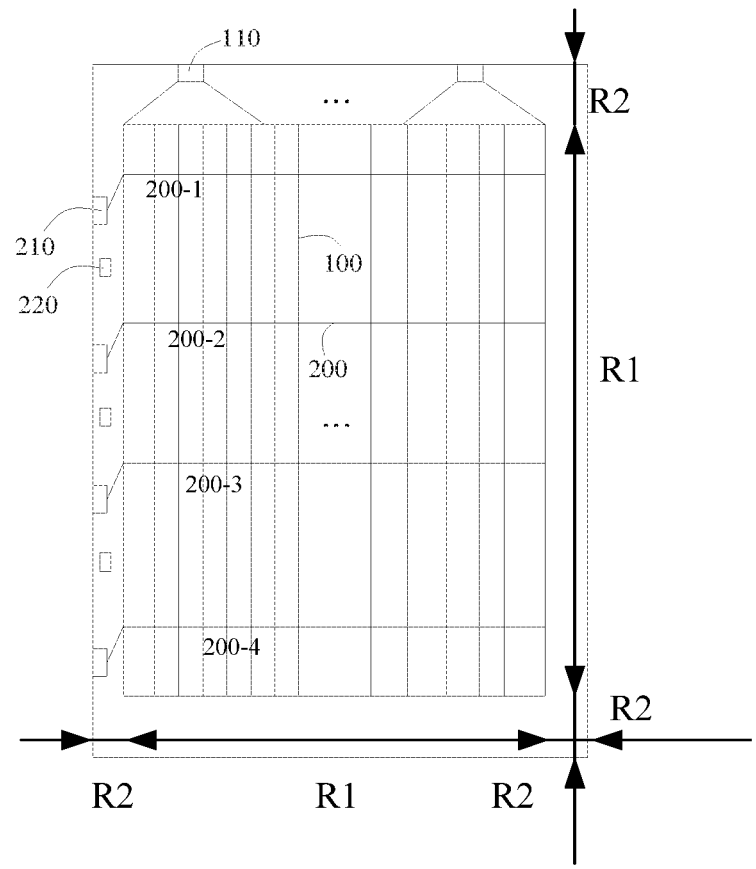
FIG. 1 is a schematic wiring diagram of an X-ray detecting panel of an embodiment of the present disclosure.

FIG. 1 is a schematic wiring diagram of an X-ray detecting panel provided by the present disclosure. As shown in FIG. 1, the X-ray detecting panel includes a main bias voltage signal line 100 and a photodiode (not shown), and a cathode of the photodiode is electrically connected to the main bias voltage signal line 100. The X-ray detecting panel further includes at least one auxiliary bias voltage signal line 200 electrically connected to the main bias voltage signal line 100.

During detection of a signal using the X-ray detecting panel, a main bias voltage signal source 110 is used to supply a main bias voltage to the main bias voltage signal line 100, and an auxiliary bias voltage signal source 210 is used to supply an auxiliary bias voltage to the auxiliary bias voltage signal line 200.

FIG. 1 shows four auxiliary bias voltage signal lines 200 and fourteen main bias voltage signal lines 100, but the present disclosure is not limited thereto. A first auxiliary bias voltage signal line 200-1 of the four auxiliary bias voltage signal lines 200 is electrically connected to each of the fourteen main bias voltage signal lines 100, a second auxiliary bias voltage signal line 200-2 of the four auxiliary bias voltage signal lines is electrically connected to each of the fourteen main bias voltage signal lines 100, a third auxiliary bias voltage signal line 200-3 of the four auxiliary bias voltage signal lines 200 is electrically connected to each of the fourteen main bias voltage signal lines 100, and a fourth auxiliary bias voltage signal line 200-4 of the four auxiliary bias voltage signal lines 200 is electrically connected to each of the fourteen main bias voltage signal lines 100.

In a case that the main bias voltage signal source 110 supplies the main bias voltage to the main bias voltage signal line 100, the main bias voltage at the top of the X-ray detecting panel is relatively high. The main bias voltage at the first auxiliary bias voltage signal line 200-1 is reduced due to the load on the line, and owing to the auxiliary bias voltage provided by the first auxiliary bias voltage signal line 200-1, the main bias voltage at the first auxiliary bias voltage signal line 200-1 is compensated. The main bias voltage at the second auxiliary bias voltage signal line 200-2 is reduced due to the load on the line, and owing to the auxiliary bias voltage provided by the second auxiliary bias voltage signal line 200-2, the main bias voltage at the second auxiliary bias voltage signal line 200-2 is compensated. The main bias voltage at the third auxiliary bias voltage signal line 200-3 is reduced due to the load on the line, and owing to the auxiliary bias voltage provided by the third auxiliary bias voltage signal line 200-3, the main bias voltage at the third auxiliary bias voltage signal line 200-3 is compensated. The main bias voltage at the fourth auxiliary bias voltage signal line 200-4 is reduced due to the load on the line, and owing to the auxiliary bias voltage provided by the fourth auxiliary bias voltage signal line 200-4, the main bias voltage at the fourth auxiliary bias voltage signal line 200-4 is compensated.

Since the auxiliary bias voltage signal source 210 can supply an auxiliary bias voltage to a main bias voltage signal line 100 through an auxiliary bias voltage signal line 200, power consumption caused by an internal resistance of the main bias voltage signal line 100 can be reduced or even eliminated, so as to prevent a detection current from being affected by a voltage drop (RC lading) caused by the internal resistance of the main bias voltage signal line 100, or at least reduce the influence of the voltage drop caused by the internal resistance of the main bias voltage signal line. As a result, the detection current is only affected by an intensity of an optical signal irradiating onto the photodiode 300, improving detection accuracy of the X-ray detecting panel.

It should be noted that the number of the auxiliary bias voltage signal line(s) may be one or more as required. In a case of a plurality of auxiliary bias voltage signal lines, if one of the auxiliary bias voltage signal lines is disconnected, the main bias voltage can be compensated by the remaining auxiliary bias voltage signal line(s), thereby improving reliability.

A data voltage is applied to an anode 320 of the photodiode 300 using a data signal source, and the main bias voltage signal line 100 is electrically connected to the cathode 310 of the photodiode, so that the photodiode 300 is reverse biased (i.e., to form an equivalent capacitor) under the action of the main bias voltage signal line 100. The quantity of electricity stored in the photodiode 300 changes as the intensity of light irradiating on the photodiode 300 changes, accordingly, a detection current output from the main bias voltage signal line 100 also changes, and the intensity of the X-ray can be determined by detecting the current in the main bias voltage signal line 100.

In the present disclosure, there are no special requirements on the arrangement of the photodiode 300 and the number of the photodiodes 300. As a specific implementation, in order to obtain an X-ray detection image, the X-ray detecting panel includes a plurality of photodiodes 300 and a plurality of main bias voltage signal lines 100. The X-ray detecting panel is divided into a detection area R1 and a peripheral area R2 located on at least one side of the detection area, and the detection area R1 is divided into a plurality of detection units 130, e.g., an array of detection units 130 in a plurality of rows and a plurality of columns. Each detection unit is provided therein with a photodiode 300, and the cathodes 310 of the photodiodes 300 in the detection units in a same column are electrically connected to a same main bias voltage signal line 100.

The auxiliary bias voltage signal source 210 may be an external signal source outside the panel. Alternatively, in the absence of an additional external signal source, the auxiliary bias voltage signal line 200 may be directly connected to a portion of the main bias voltage signal line 100 in the peripheral area R2, so as to achieve signal compensation by means of the main bias voltage signal source 110.

The X-ray detecting panel is used in combination with a corresponding signal conversion module and a display panel. The detection units of the X-ray detecting panel may correspond to pixel units of the display panel. For example, one detection unit corresponds to one pixel unit, or several detection units correspond to one pixel unit, or one detection unit corresponds to several pixel units.

The detection unit may convert an induced current corresponding to the photodiode 300 in the detection unit into a grayscale voltage, and drive the corresponding pixel unit on the display panel to emit light, thereby displaying a detection image.

As described above, the photodiodes 300 in a same column are connected to a same main bias voltage signal line 100, and therefore, the data signal source can sequentially supply corresponding anode voltages (i.e., data voltages) to the anodes 320 of respective rows of photodiodes 300 by scanning. The main bias voltage signal line 100 is electrically connected to the cathode 310 of the photodiode such that the photodiode 300 is reverse biased under the action of the main bias voltage signal line 100. The quantity of electricity stored in the photodiode 300 changes as the intensity of light irradiating on the photodiode 300 changes, accordingly, the detection current output from the main bias voltage signal line 100 also changes, and the intensity of the X-ray can be determined by detecting the current in the main bias voltage signal line, thereby achieving detection of the X-ray.

As described above, the photodiodes 300 in a same column are connected to a same main bias voltage signal line 100, and correspondingly, the plurality of main bias voltage signal lines 100 are arranged in parallel in the column direction of the array of photodiodes 300. In an embodiment, in order to facilitate arrangement of the auxiliary bias voltage signal lines 200 and ensure uniform compensation for each main bias voltage signal line 100, as shown in FIG. 1, an extending direction of the auxiliary bias voltage signal lines 200 is perpendicular to or approximately perpendicular to an extending direction of the main bias voltage signal lines 100.

In the present disclosure, the number of the auxiliary bias voltage signal line(s) 200 is not particularly limited, and may be determined according to the size of the X-ray detecting panel and the length of the main bias voltage signal lines 100. Generally, the larger the size of the X-ray detecting panel, the larger the number of the auxiliary bias voltage signal lines 200. In the embodiment shown in FIG. 1, the X-ray detecting panel includes a plurality of auxiliary bias voltage signal lines 200.

Figure 2:
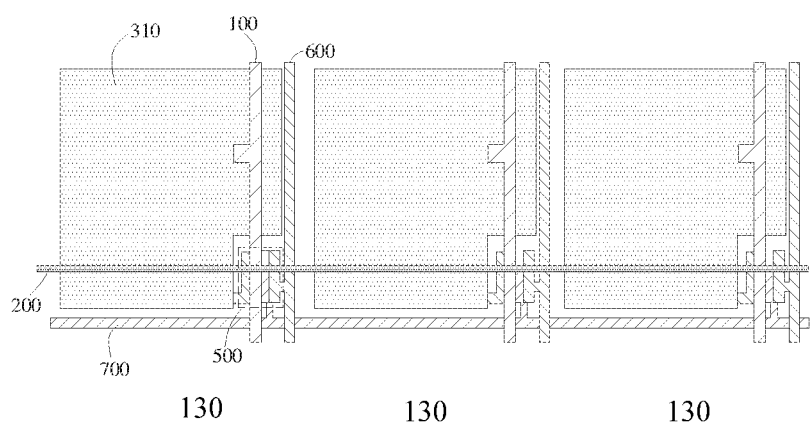
FIG. 2 is a schematic partial view of a plurality of detection units in an X-ray detecting panel of an embodiment of the present disclosure.
Figure 3:
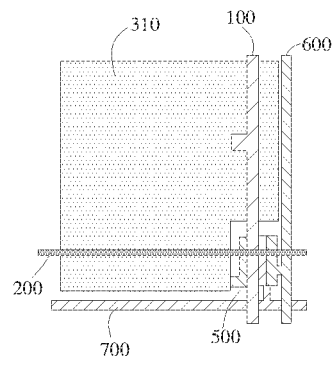
FIG. 3 is a schematic diagram of a single detection unit of an X-ray detecting panel of an embodiment of the present disclosure.

FIG. 2 is a schematic diagram of a portion of an X-ray detecting panel, and only three different detection units 130 in a same row of the array of the plurality of detection units are shown in FIG. 2. FIG. 3 shows one of the three detection units of FIG. 2, and the main bias voltage signal line 100, the auxiliary bias voltage signal line 200, and the cathode 310 of the photodiode are located in three different layers, respectively.

Figure 4:
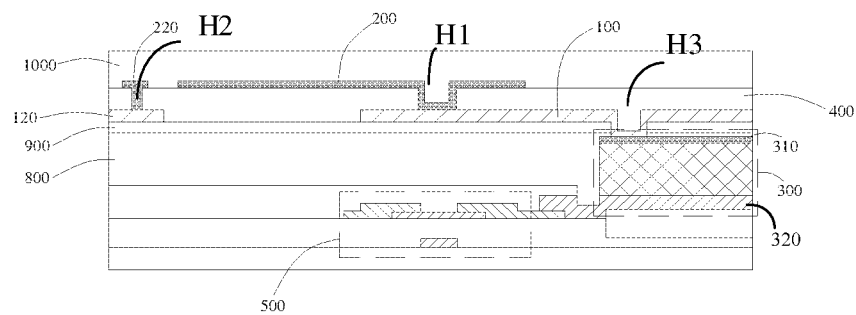
FIG. 4 is a partial cross-sectional view of the single detection unit of FIG. 3.
Figure 5:
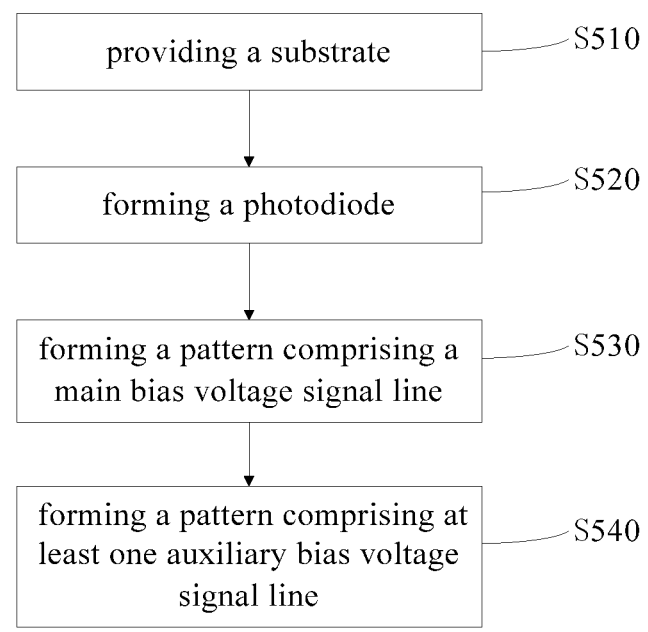
FIG. 5 is a flowchart of a manufacturing method of an X-ray detecting panel of an embodiment of the present disclosure.

FIG. 4 is a partial cross-sectional view of the single detection unit 130 of FIG. 3. As shown in FIGS. 3 and 4, a plurality of main bias voltage signal lines 100 are disposed in a same layer, and the X-ray detecting panel further includes a first passivation layer 400 covering the main bias voltage signal lines 100. The auxiliary bias voltage signal line 200 is disposed on the first passivation layer 400 and is electrically connected to the main bias voltage signal line 100 through a first via hole H1 penetrating through the first passivation layer 400.

Referring back to FIGS. 1 and 2, each of the one or more auxiliary bias voltage signal lines 200-1, 200-2, 200-3 and 200-4 is electrically connected to the plurality of main bias voltage signal lines 100 through the first via hole H1.

In this implementation, it is not necessary to change a mask for forming a pattern of the other layer, and only one mask for forming the auxiliary bias voltage signal line(s) 200 is required, which can improve versatility of an apparatus for manufacturing the X-ray detecting panel.

In the embodiment, the first passivation layer 400 is made of a silicon oxide or a silicon nitride.

It should be noted that, in addition to the main bias voltage signal line 100, the auxiliary bias voltage signal line 200, and the photodiode 300, the X-ray detecting panel also includes other circuit structures, and descriptions of the other circuit structures are omitted herein.

In order to supply a signal to the X-ray detecting panel, the X-ray detecting panel may further include at least one set of lead wires 120 and a bonding pad 220. In the present disclosure, the number of the bonding pad(s) is not particularly limited, and each set of lead wires corresponds to at least one bonding pad. In addition, there are no special requirements on the number and specific positions of the lead wires.

Accordingly, as shown in FIG. 1, lead wires (not shown) and a bonding pad 220 are disposed in the peripheral area R2 on at least one side of the X-ray detecting panel. For example, the lead wires (not shown) and the bonding pad 220 are disposed in the peripheral area R2 on the left side of the X-ray detecting panel so as not to block the detection unit.

For example, as shown in FIG. 4, the X-ray detecting panel may include a lead wire 120 that supplies a main bias voltage signal to the main bias voltage signal line 100, and the lead wire 120 may be disposed in the same layer as the main bias voltage signal line 100. A second via hole H2 penetrates through at least the first passivation layer to expose the lead wire 120.

It should be noted that the expression "second via hole penetrates through at least the first passivation layer" means that the second via hole penetrates through all insulation layer(s) between the bonding pad 220 corresponding to the second via hole and the lead wire corresponding to the bonding pad 220.

The bonding pad 220 corresponding to the set of lead wires that provide a main bias voltage signal to the main bias voltage signal line 100 electrically connects the lead wires 120 to the main bias voltage source 110.

It should be noted that the X-ray detecting panel also has other circuit structures, each of which has a lead wire and a bonding pad 220 that correspond thereto.

In the present disclosure, the bonding pad 220 is made of a transparent electrode material. Furthermore, the bonding pad 220 is disposed on the first passivation layer 400, and the lead wire 120 is positioned under the first passivation layer 400 so as not to be exposed to the environment. Since the transparent electrode material has good corrosion resistance, the bonding pad 220 is resistant to corrosion by water vapor and oxygen in the environment, and can also prevent corrosion during subsequent process, thereby prolonging service life of the X-ray detecting panel.

The auxiliary bias voltage signal line 200 and the bonding pad 220 may be made of a same material. In a case that the material of the bonding pad 220 is a transparent electrode material, the material of the auxiliary bias voltage signal line 200 is also the transparent electrode material. The auxiliary bias voltage signal line 200 made of the transparent electrode material does not block the detection unit, so that the aperture ratio of the X-ray detecting panel is not affected, and the detection accuracy is improved.

As shown in FIG. 4, the auxiliary bias voltage signal line 200 and the bonding pad 220 are in a same layer and made of a same material. In an example, the auxiliary bias voltage signal line 200 and the bonding pad 220 are made of the transparent electrode material, and the bonding pad 220 and the auxiliary bias voltage signal line 200 are formed by one patterning process. Further, the bonding pad 220 and the auxiliary bias voltage signal line 200 share the first passivation layer 400, thereby simplifying the manufacturing method of the X-ray detecting panel and reducing the cost.

In addition to the advantages of saving processes and reducing cost, another advantage of using the transparent electrode material to fabricate the auxiliary bias voltage signal line 200 is to avoid blocking of light emitted towards a surface of the photodiode, and improve detection accuracy.

In order to improve the detection accuracy, the cathode 310 of the photodiode 300 is made of a transparent electrode material.

As described above, in order to obtain the detection currents of the photodiodes 300 in different detection units, data voltages may be sequentially supplied to the photodiodes 300 in different rows.

In an embodiment, in order to sequentially supply data voltages to the photodiodes 300 in different rows, as shown in FIG. 2, the X-ray detecting panel further includes a plurality of switching transistors 500, a plurality of data lines 600, and a plurality of gate lines 700. The plurality of data lines 600 intersect with the plurality of gate lines 700 to divide the X-ray detecting panel into a plurality of detection units, for example, an array of detection units in a plurality of rows and a plurality of columns. As shown in FIG. 2, each detection unit is provided therein with one switching transistor 500, each column of switching transistors 500 correspond to a same data line 600, and each row of switching transistors 500 correspond to a same gate line 700. As shown in FIG. 4, a first electrode of the switching transistor 500 is electrically connected to the anode 320 of the photodiode 300 in the detection unit in which the switching transistor 500 is located, as shown in FIGS. 2 and 3, a second electrode of the switching transistor 500 is electrically connected to the data line 600 corresponding to the switching transistor 500, and a control electrode (e.g. gate electrode) of the switching transistor 500 is connected to the gate line 700.

Scan signals may be sequentially supplied to the plurality of gate lines 700 from a gate driving circuit to control the switching transistors 500 in a respective row to be turned on. Since the second electrode of the switching transistor 500 is electrically connected to the data line 600 corresponding to the switching transistor 500, and the first electrode of the switching transistor 500 is electrically connected to the anode 320 of the photodiode 300 in the detection unit in which the switching transistor 500 is located, the anode of the corresponding photodiode 300 can be connected to the corresponding data line 600 after the switching transistor 500 is turned on, so that a capacitor can be formed between the anode of the photodiode and the cathode of the photodiode.

In the present disclosure, the material of the main bias voltage signal line 100 is not particularly limited. In order to reduce influence of resistance on the detection result, the main bias voltage signal line 100 is made of a metal material.

In order to prolong the service life of the X-ray detecting panel, the main bias voltage signal line 100 made of a metal material covers the switching transistor 500, so that the aging phenomenon caused by direct irradiation of light on a channel region of the switching transistor 500 can be minimized or even eliminated.

In the present disclosure, the specific type of the photodiode is not particularly limited, and the photodiode may be a PIN diode.

The photodiode has a relatively large thickness. In an embodiment, in order to prevent the main bias voltage signal line 100 from being disconnected, the X-ray detecting panel includes a planarization layer 800 and a second passivation layer 900. As shown in FIG. 4, the planarization layer 800 covers the photodiode 300, the second passivation layer 900 covers the planarization layer 800, and the main bias voltage signal line 100 is formed on the second passivation layer 900 and electrically connected to the cathode 310 of the photodiode 300 through a third via hole H3 penetrating through the second passivation layer 900 and the planarization layer 800.

The planarization layer 800 is made of an organic resin material, so that the planarization layer 800 having a relatively large thickness can be obtained, thereby better achieving the effect of planarization. Since it is difficult to directly deposit a metal material on the planarization layer made of a resin material, the presence of the second passivation layer 900 can facilitate formation of the main bias voltage signal line 100 made of a metal material by deposition.

During detection of X-rays, X-rays need to be converted into visible light, then a photodiode is used to detect an intensity of the visible light, and an intensity of X-rays is determined according to the intensity of the visible light.

In an embodiment, a scintillation layer may be utilized to convert X-rays into visible light.

The X-ray detecting panel provided by the present disclosure may or may not include the scintillation layer. In a case that the X-ray detecting panel does not include the scintillation layer, a scintillation film may be used to replace the scintillation layer, and when using the X-ray detecting panel, the scintillation film is attached onto a surface of the X-ray detecting panel for performing X-ray detection.

As shown in FIG. 4, the X-ray detecting panel further includes a scintillation layer 1000 disposed on a light incident surface of the X-ray detecting panel.

As another aspect of the present disclosure, there is provided an X-ray detecting device including an X-ray detecting panel and a main bias voltage signal source. The X-ray detecting panel is the above X-ray detecting panel provided in the present disclosure, and further includes an auxiliary bias voltage signal source. The main bias voltage signal source is electrically connected to the main bias voltage signal line, and the auxiliary bias voltage signal source is electrically connected to the auxiliary bias voltage signal line.

As described above, in the presence of the auxiliary bias voltage signal source, an auxiliary voltage can be supplied to the main bias voltage signal line through the auxiliary bias voltage signal line when detecting the X-rays, so that the voltage drop caused by the internal resistance of the main bias voltage signal line can be compensated for, and the detection accuracy of the X-rays can be improved.

As described above, as an implementation, the X-ray detecting panel is divided into a detection area and a peripheral area located on at least one side of the detection area, and the photodiode is disposed in the detection area. In order to improve an effective area of the detection area, the auxiliary bias voltage signal source and the main bias voltage signal source are disposed in the peripheral area.

As a third aspect of the present disclosure, there is provided a manufacturing method of an X-ray detecting panel, including steps of:
 S510: providing a substrate;
 S520: forming a photodiode;
 S530: forming a pattern including a main bias voltage signal line, the main bias voltage signal line being electrically connected to a cathode of the photodiode; and
 S540: forming a pattern including at least one auxiliary bias voltage signal line, the auxiliary bias voltage signal line being electrically connected to the main bias voltage signal line.

The manufacturing method provided in the present disclosure is used for manufacturing the X-ray detecting panel provided in the present disclosure, and as described above, the auxiliary bias voltage signal line is used for supplying an auxiliary bias voltage to the main bias voltage signal line, so as to compensate for the voltage drop caused by the internal resistance of the main bias voltage signal line, thereby improving the detection accuracy of the X-rays.

In the present disclosure, the order in which steps S530 and S540 are performed is not particularly limited.

For example, step S530 and step S540 may be performed at the same time, or step S530 may be performed prior to step S540, or step S540 may be performed prior to step S530.

In the present disclosure, there is no special requirement on how to perform step S530. For example, the pattern including the main bias voltage signal line may be formed by photolithographic patterning. Correspondingly, step S530 may include the following steps of:
 forming a first conductive material layer;
 forming a first photoresist layer on the first conductive material layer;
 exposing and developing the first photoresist layer to obtain a first mask; and
 performing wet-etching to obtain the pattern including the main bias voltage signal line.

Similarly, in the present disclosure, there is no special requirement on how to perform step S540, and the pattern including the auxiliary bias voltage signal line may be formed by photolithographic patterning. Correspondingly, step S540 may include the following steps of:
 forming a second conductive material layer;
 forming a second photoresist layer on the second conductive material layer;
 exposing and developing the second photoresist layer to obtain a second mask; and
 performing wet-etching to obtain the pattern including the auxiliary bias voltage signal line.

As described above, the X-ray detecting panel may include a plurality of photodiodes and a plurality of bias voltage signal lines, and correspondingly, the plurality of bias voltage signal lines include a plurality of auxiliary bias voltage signal lines and a plurality of main bias voltage signal lines. The X-ray detecting panel is divided into a detection area and a peripheral area located on at least one side of the X-ray detecting panel. The detection area is divided into a plurality of detection units, each of which is provided with a photodiode, and cathodes of the photodiodes in the detection units in a same column are electrically connected to a same main bias voltage signal line. The plurality of main bias voltage signal lines are disposed in a same layer.

In order to save the developing process, a conventional process may be modified to obtain the manufacturing method provided by the present disclosure. That is to say, after fabricating a semi-finished product including the substrate, the photodiode and the main bias voltage signal line by using an existing process, a pattern including one or more auxiliary bias voltage signal lines is formed directly on the semi-finished product.

Furthermore, the manufacturing method further includes, between step S530 and step S540, the following steps of:
 forming a first passivation layer 400; and forming a first via hole H1 penetrating through the first passivation layer 400.

After the first via hole H1 is formed, the auxiliary bias voltage signal line 200 formed in the step of forming the pattern including the auxiliary bias voltage signal line may be electrically connected to the main bias voltage signal line 100 through the first via hole H1.

Moreover, the manufacturing method further includes a step of forming a second via hole H2 after the step of forming the first passivation layer, the second via hole H2 penetrating through at least the first passivation layer 400 to expose the lead wire 120. The first via H1 and the second via H2 are formed by one patterning process.

The manufacturing method further includes, after forming the second via hole H2, a step of forming a pattern including a bonding pad 220, the bonding pad 220 being electrically connected to the lead wire 120 through the second via hole H2. The pattern of the auxiliary bias voltage signal line 200 and the pattern of the bonding pad 220 are formed by one patterning process, which simplifies the manufacturing process.

In manufacturing the X-ray detecting panel, the auxiliary bias voltage signal line 200 and the bonding pad 220 share the first passivation layer 400, and may be fabricated by one patterning process, so that the steps required for the manufacturing method can be reduced, and the cost can be lowered.

As described above, the bonding pad 220 and the auxiliary bias voltage signal line 200 may be made of a transparent electrode material. The manufacturing method provided by the present disclosure is used for manufacturing the above X-ray detecting panel provided by the present disclosure, and the advantages of making the bonding pad and the auxiliary bias voltage signal line using the transparent electrode material have been described above, and are not repeatedly described herein.

In the present disclosure, the method of forming a pattern including the bonding pad 220 and the auxiliary bias voltage signal line 200 by a patterning process is not particularly limited, for example, the pattern including the bonding pad and the auxiliary bias voltage signal line may be formed by wet-etching, and in this case, the method may include:

forming a transparent electrode material layer;

coating a photoresist layer on the transparent electrode material layer;

exposing and developing the photoresist layer to obtain a pattern of a third mask; and wet-etching the transparent electrode material layer on which the pattern of the third mask has been formed to obtain the pattern including the auxiliary bias voltage signal line 200 and the bonding pad 220.

In the present disclosure, the material of the first passivation layer 400 is not particularly limited, and for example, the first passivation layer may be formed of a silicon oxide and/or a silicon nitride.

In the present disclosure, the material of the auxiliary bias voltage signal line 200 is a transparent electrode material so as not to block the photodiode and improve the detection accuracy.

As described above, the substrate includes a plurality of switching transistors, a plurality of data lines, and a plurality of gate lines, and the plurality of the data lines intersect with the plurality of the gate lines to divide the X-ray detecting panel into a plurality of detection units, e.g., an array of detection units in a plurality of columns and a plurality of rows, each detection unit is provided therein with a switching transistor, each column of switching transistors correspond to a same data line, each row of switching transistors correspond to a same gate line, the first electrode of the switching transistor is electrically connected to the anode of the photodiode in the detection unit in which the switching transistor is located, the second electrode of the switching transistor is electrically connected to the data line corresponding to the switching transistor, and the gate electrode of the switching transistor is electrically connected to the gate line corresponding to the switching transistor.

In an embodiment, the main bias voltage signal line is made of a metal material, and covers the switching transistor. As described above, the main bias voltage signal line made of a metal material has a small internal resistance, so that the voltage drop during signal transmission can be reduced. The main bias voltage signal line covers the switching transistor, which can prevent light from directly irradiating on the channel region of the switching transistor and prevent aging of the switching transistor due to illumination, thereby prolonging the service life of the X-ray detecting panel.

In order to improve the detection accuracy, the cathode of the photodiode is made of a transparent electrode material.

In order to improve the yield of the X-ray detecting panels, the manufacturing method includes, between step S520 and step S530, the following steps of:

forming a planarization layer 800 on the substrate on which the photodiode has been formed, the planarization layer 800 covering a layer where the photodiode 300 is located;

forming a second passivation layer 900; and forming a third via hole H3 penetrating through the second passivation layer 900 and the planarization layer 800, the third via hole H3 corresponding to the cathode 310 of the photodiode in position, such that the main bias voltage signal line 100 is electrically connected to the cathode 310 of the photodiode 300 through the third via hole H3.

The manufacturing method further includes:

forming a scintillation layer 1000 on a light incident side of the photodiode, the scintillation layer 1000 being capable of converting X-rays into visible light.

It could be understood that the above implementations are merely exemplary embodiments adopted for describing the principle of the present disclosure, but the present disclosure is not limited thereto. Various modifications and improvements can be made by those skilled in the art without departing from the spirit and scope of the disclosure, and these modifications and improvements are also considered to be within the protection scope of the present disclosure.

The invention claimed is:

1. An X-ray detecting panel, comprising:
 a substrate;
 a photodiode on the substrate;
 a main bias voltage signal line, which is on a side of the photodiode distal to the substrate, electrically connected to a cathode of the photodiode, and configured such that a main bias voltage is provided to the photodiode through the main bias voltage signal line; and
 an auxiliary bias voltage signal line, which is on a side of the main bias voltage signal line distal to the photodiode, and configured such that an auxiliary bias voltage is provided to the photodiode through the auxiliary bias voltage signal line;
 a layer in which the main bias voltage signal line is located;
 a first passivation layer covering the layer; and
 a first via hole penetrating through the first passivation layer, wherein the auxiliary bias voltage signal line is on a side of the first passivation layer distal to the main bias voltage signal line, and the auxiliary bias voltage signal line is electrically connected to the main bias voltage signal line through the first via hole.

2. The X-ray detecting panel of claim 1, further comprising:
an auxiliary bias voltage signal source configured to supply the auxiliary bias voltage signal line with an auxiliary bias voltage capable of compensating the main bias voltage at a position where the auxiliary bias voltage signal line is electrically connected to the main bias voltage signal line.

3. The X-ray detecting panel of claim 1, wherein an extending direction of the auxiliary bias voltage signal line is perpendicular to an extending direction of the main bias voltage signal line.

4. The X-ray detecting panel of claim 1, further comprising:
a bonding pad on a side of the first passivation layer distal to the main bias voltage signal line, and
a lead wire on a side of the first passivation layer distal to the bonding pad; and
a second via hole penetrating through at least the first passivation layer;
wherein the bonding pad is electrically connected to the lead wire through the second via hole, and
the auxiliary bias voltage signal line is in a same layer as the bonding pad.

5. The X-ray detecting panel of claim 4, wherein the auxiliary bias voltage signal line and the bonding pad comprise a transparent electrode material.

6. The X-ray detecting panel of claim 4, further comprising:
a layer in which the photodiode is located on a cathode side of the photodiode;
a planarization layer covering the layer in which the photodiode is located on the cathode side of the photodiode;
a second passivation layer covering the planarization layer on a side of the planarization layer distal to the photodiode; and
a third via hole penetrating through the second passivation layer and the planarization layer,
wherein the main bias voltage signal line is on a side of the second passivation layer distal to the planarization layer, and is electrically connected to a cathode of the photodiode through the third via hole.

7. The X-ray detecting panel of claim 4, further comprising:
a data line;
a gate line; and
a plurality of detection units, each detection unit of the plurality of detection units comprising the photodiode and a switching transistor,
a first electrode of the switching transistor is connected to an anode of the photodiode, a second electrode of the switching transistor is connected to the data line, a control electrode of the switching transistor is connected to the gate line, and a cathode of the switching transistor is connected to the main bias voltage signal line.

8. The X-ray detecting panel of claim 7, further comprising:
a plurality of data lines; and
a plurality of gate lines, wherein the plurality of data lines and the plurality of gate lines intersect with each other to define the plurality of detection units,
second electrodes of switching transistors in the plurality of detection units in a same column are connected to a same data line, and
control electrodes of the switching transistors in the plurality of detection units in a same row are connected to a same gate line.

9. The X-ray detecting panel of claim 8, wherein the main bias voltage signal line comprises a metal material and covers the switching transistor.

10. The X-ray detecting panel of claim 8, wherein cathodes of photodiodes in the plurality of detection units in a same column are electrically connected to a same main bias voltage signal line.

11. The X-ray detecting panel of claim 7, further comprising:
a detection area; and
a peripheral area on at least one side of the detection area, wherein the plurality of detection units are within the detection area, and the bonding pad and the lead wire are in the peripheral area.

12. The X-ray detecting panel of claim 1, further comprising:
a plurality of main bias voltage signal lines comprising the main bias voltage signal line; and
at least one auxiliary bias voltage signal line comprising the auxiliary bias voltage signal line;
wherein the at least one auxiliary bias voltage signal line is electrically connected to all of the plurality of main bias voltage signal lines.

13. The X-ray detecting panel of claim 1, further comprising:
a scintillation layer on a light incident surface and capable of converting X-rays into visible light.

14. An X-ray detecting device, comprising:
an X-ray detecting panel of claim 1;
a main bias voltage signal source configured to supply a main bias voltage to the photodiode through the main bias voltage signal line; and
an auxiliary bias voltage signal source configured to supply an auxiliary bias voltage to the photodiode through the auxiliary bias voltage signal line.

15. The X-ray detecting device of claim 14, wherein the main bias voltage signal source and the auxiliary bias voltage signal source are a same signal source.

16. A manufacturing method of an X-ray detecting panel, comprising:
providing a substrate;
forming a photodiode on the substrate;
forming a pattern comprising a main bias voltage signal line on a side of the photodiode distal to the substrate, the main bias voltage signal line being electrically connected to a cathode of the photodiode; and
forming a pattern comprising an auxiliary bias voltage signal line on a side of the pattern comprising the main bias voltage signal line distal to the photodiode;
between the step of forming the pattern comprising the main bias voltage signal line on the side of the photodiode distal to the substrate and the step of forming the pattern comprising the auxiliary bias voltage signal line on the side of the pattern comprising the main bias voltage line distal to the photodiode, further comprising steps of:

forming a first passivation layer on a side of the pattern comprising the main bias voltage signal line distal to the photodiode; and forming a first via hole penetrating through the first passivation layer such that the auxiliary bias voltage signal line obtained in the step of forming the pattern comprising the auxiliary bias voltage signal line is electrically connected to the main bias voltage signal line through the first via hole.

17. The manufacturing method of claim 16, further comprising:

forming a pattern comprising a lead wire prior to the step of forming the first passivation layer;

forming a second via hole after forming the first passivation layer, the second via hole penetrating through at least the first passivation layer to expose the lead wire, the first via hole and the second via hole being formed by one patterning process; and forming a pattern comprising a bonding pad on a side of the first passivation layer distal to the lead wire after forming the second via hole, the bonding pad being electrically connected to the lead wire through the second via hole, wherein the pattern comprising the auxiliary bias voltage signal line and the pattern comprising the bonding pad are formed by one patterning process.

* * * * *